(12) United States Patent
Jones, Jr. et al.

(10) Patent No.: US 12,159,126 B1
(45) Date of Patent: Dec. 3, 2024

(54) SYSTEMS AND METHODS FOR IDENTIFYING UNUSED CODE

(71) Applicant: United Services Automobile Association (USAA), San Antonio, TX (US)

(72) Inventors: David M. Jones, Jr., San Antonio, TX (US); Robert Lee Black, San Antonio, TX (US); Timothy Blair Chalmers, San Antonio, TX (US); Gideon Bowie Luck, Wylie, TX (US); Sumita T. Jonak, San Antonio, TX (US); Ana Rosa Maldonado, San Antonio, TX (US); Oscar Roberto Tijerina, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 72 days.

(21) Appl. No.: 17/867,093

(22) Filed: Jul. 18, 2022

Related U.S. Application Data

(60) Provisional application No. 63/223,420, filed on Jul. 19, 2021.

(51) Int. Cl.
*G06F 9/44* (2018.01)
*G06F 8/41* (2018.01)
*G06F 8/70* (2018.01)

(52) U.S. Cl.
CPC .............. *G06F 8/4435* (2013.01); *G06F 8/70* (2013.01)

(58) Field of Classification Search
CPC ................................. G06F 8/4435; G06F 8/70
USPC .................................................. 717/124–130
See application file for complete search history.

(56) References Cited

U.S. PATENT DOCUMENTS

| | | | | |
|---|---|---|---|---|
| 6,091,896 | A * | 7/2000 | Curreri | G06F 11/3628 714/E11.21 |
| 9,858,058 | B2 * | 1/2018 | Gschwind | G06F 8/4435 |
| 2016/0139898 | A1 * | 5/2016 | Pudiyapura | G06F 8/33 717/158 |

* cited by examiner

*Primary Examiner* — Chuck O Kendall
(74) *Attorney, Agent, or Firm* — Fletcher Yoder, P.C.

(57) ABSTRACT

Techniques are provided herein to identify unused computer code in a computer code corpus. Execution tracking characteristics may be used to identify unused code branches within the computer code corpus. A notification may be provided, indicating the unused code along with an option for easy removal.

20 Claims, 3 Drawing Sheets

SYSTEMS AND METHODS FOR IDENTIFYING UNUSED CODE

CROSS-REFERENCE TO RELATED APPLICATION

This application claims priority to and the benefit of U.S. Provisional Patent Application No. 63/223,420, entitled "SYSTEMS AND METHODS FOR IDENTIFYING UNUSED CODE", filed Jul. 19, 2021, which is herein incorporated by reference in its entirety.

BACKGROUND

The present disclosure relates generally to identifying unused computer code. A given computer program may include millions of lines of computer code. Over time, the computer program may be revised or edited to include additional lines of code. When new code is added, older lines of code may become obsolete and may no longer be used in executing the computer program. Computer programmers may sometimes leave the older lines of code in the computer program. At times, it may be beneficial to identify the older lines of code.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

With an increased utilization of computers within the enterprise, organizations often use many different computer applications and/or programs, both internally and externally. As a business's needs evolve, certain computer applications and/or programs may be updated in order to meet the business's current needs. As these applications and/or programs are updated, code associated with these applications may be changed. The changes may include various edits to old code, additions of new code, and so forth. Often times, the changes to the code are made by adding to existing code or replicating sections of code and leaving the old code accessible, in order to have flexibility in order to go back to the prior version of the code if desired. Unfortunately, however, as discussed in detail below, changing the code in this manner may result in vast amounts of old, unused code that is no longer relevant to the computer program or the organization. The vast amount of unused code may use large amounts of memory and other resources, slowing down operational efficiency and adding to operating costs.

With the foregoing in mind, in some embodiments, the techniques described herein may facilitate identifying unused code within a corpus of computer code, enabling quick remediation by, for example, deletion or quarantining of the code for possible future deletion.

Figure 1:
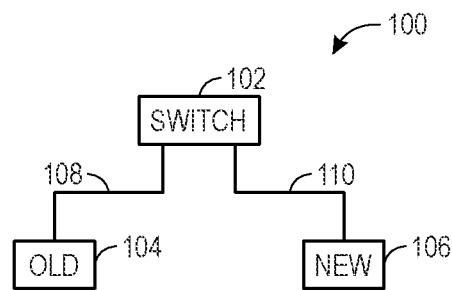
FIG. 1 is a block diagram illustrating a switchover from old code source to new code source for execution via a computer program, in accordance with embodiments described herein.

By way of introduction, FIG. 1 is a block diagram 100 illustrating a technique used for switching from an old code source 104 (e.g., code library, datastore, etc.) to a new code source 106, resulting in updated program execution, in accordance with embodiments described herein. As illustrated, at least a first switch statement 102 may be provided in the program code to remove a reference 108 to the old code source 104 and replace it with a reference 110 to a new code source. The first switch statement 102 may be associated with a particular computer program or task to be executed in a suitable programming language (e.g., Java, JavaScript, C++, C #, etc.). The first switch statement 102 may be used to execute different parts of code based on a value of a particular expression. For example, in some embodiments, the program code containing the first switch statement 102 may remain unmodified, while an external data source referenced by the first switch statement 102 is altered. In the illustrated embodiment, the first switch statement 102 can be used to selectively execute an old branch 104 of code or a new branch 106 of code, depending on a configuration of the first switch statement 102.

It may be appreciated that in certain conditions, one branch of code (e.g., the old branch 104 or the new branch 106) may be the more suitable branch of code to execute based on various business factors. The first switch statement 102 may dispatch execution instructions to the old branch 104 of code or the new branch 106 of code depending on a value assigned in a configuration of the first switch statement 102. For example, in one embodiment, the first switch statement 102 may cause execution of the new branch 106 of code when a configuration of the first switch statement 102 include a "1" in the first switch statement 102 configuration data and otherwise, may cause execution of the old branch 104 when the configuration data includes a "0" or other data. If the new branch 106 of code is executed in a suitable manner, the first switch statement 102 may continue to dispatch execution instructions to the new branch 106 of code while no longer calling the old branch 104 of code. As discussed in further detail below, the unused branches of code (i.e., old branch 104) may be identified and removed from the applications and/or computer program(s) in order to free up memory and other system resources.

Figure 2:
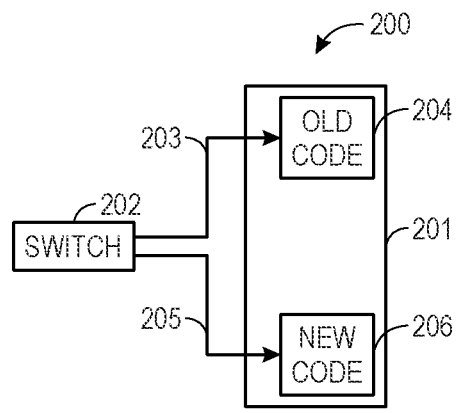
FIG. 2 is a block diagram for selecting a block of code within a computer program for execution, in accordance with embodiments described herein.

FIG. 2 illustrates an additional technique for switching from old code to new code. In the illustrated block diagram 200 a document 201 (e.g., program, web page, a spreadsheet, a word processing document, an email, a contract, and so forth) that contains updated content/computer code is provided. The document 201 may include various types of content such as titles, headings, images, diagrams, infographics, logos, screenshots, and images. Based on the particular type of content, a second switch statement 202 (e.g., either internal to or external to the document 201) may be used to call or bypass code associated with the content, similar to first switch statement 102 discussed in FIG. 1. For example, the second switch statement 202 may be used to execute code associated with a first version of a product via a reference 203 to an old branch 204. The old branch 204 may be associated with code corresponding to the first version of the product (e.g., product photos, description, order button, etc.).

Figure 3:
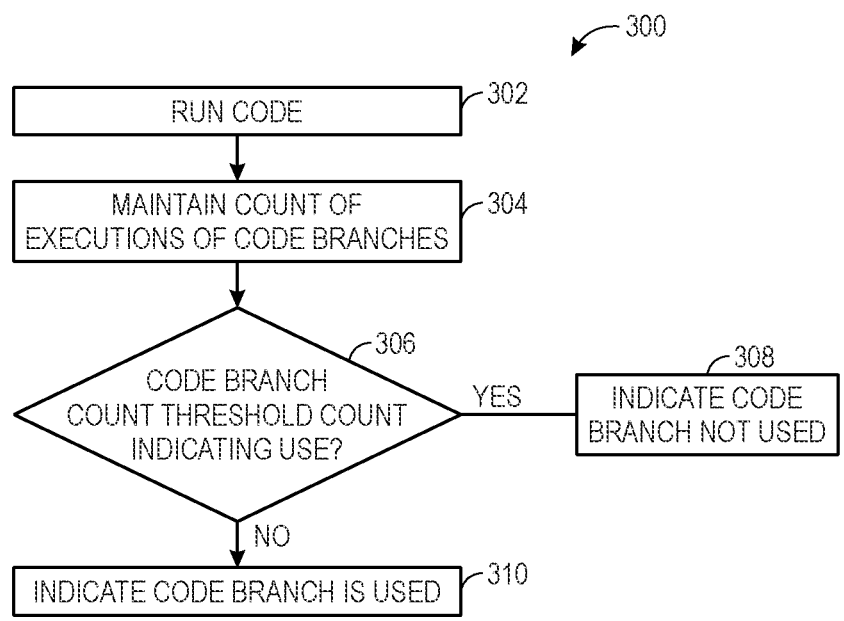
FIG. 3 is a flow chart, illustrating a process for determining unused code based upon how often the code is called, in accordance with embodiments described herein.
Figure 4:
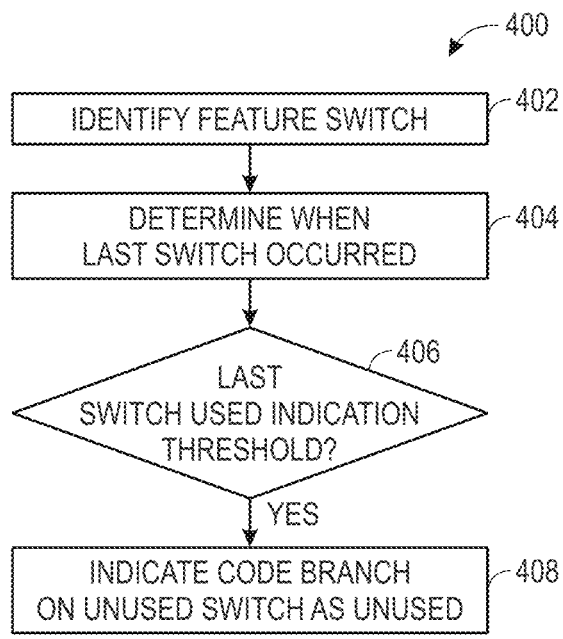
FIG. 4 is a flow chart, illustrating a process for identifying unused code based upon when a particular line or block of code was switched away from, in accordance with embodiments described herein.
Figure 5:
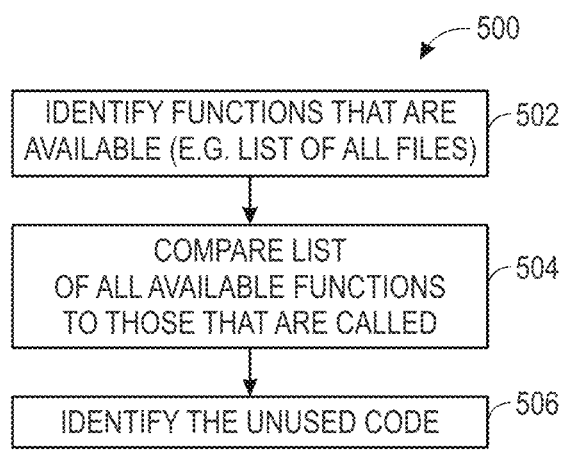
FIG. 5 is a flow chart, illustrating a process for identifying unused code based upon code implemented by a program.

When a subsequent version of the product is released, the old branch 204 of code may be bypassed (e.g., as illustrated by the dashed reference 203) in order to prevent the product details (e.g., product photos, description, order button, etc.) associated with the first version of the product from being displayed. That is, the second switch statement 202 may cause replacement execution of the old branch 204 to a new branch 206 of code, by providing a reference 205 to the new branch 206. Indeed, the second switch statement 202 may assign a value in the statement sequence in order to execute the new branch 206 of code and switch off the old branch 204 of code. By executing the new branch 206 of code, product details associated with the subsequent version of the product may be displayed. That is, the product details (e.g., product photos, description, order button, etc.) associated with the subsequent version of the product may then be displayed. However, as discussed above, the old branch 204 of code may still be present in the application/program associated with the web page 201. FIGS. 3-5 discuss solutions for identifying and potentially removing old code branches and/or content associated with old code branches.

FIG. 3 illustrates a process 300 for identifying old code branches based upon determining how often a particular line or block of code is called. The process 300 includes running (block 302) an application and/or program containing code. As discussed above, the code can be in any suitable programming language including but not limited to Java, JavaScript, C++, C #, and so forth. The execution of particular code branches may be analyzed at multiple points within an instruction sequence or at particular conditional constraints (e.g., executing a portion of a particular sequence only if a condition is satisfied). Moreover, the branches of code may also be analyzed for dependencies to map out dependencies between statements in a particular block of code.

The process 300 includes maintaining (block 304) a count of execution of particular code branches. Maintaining the count of execution may include an indication of a number of times the particular branch of code has been called (or bypassed) in executing a code/program. In some embodiments, the count that is maintained may be specific to a number of type of statements or commands, particular variables, arguments, conditions, and so forth. To perform the count, a code profiler may track the code as it is executed. As the code is executed, the execution pathways may be noted by the profiler and a count of identified code branches may be maintained.

The process 300 includes determining (block 306) whether the count of execution of the particular code is below a particular threshold of use. This may indicate that the branch of code is not called enough to be considered regularly used. It may be appreciated that the threshold to indicate regular use may change based on a particular project phase, scope, budget constraints, or other criteria. Indeed, the threshold may vary based in part on the type of function the code is used for. The threshold may be higher for functions that are expected to be implemented more frequently based on type. For example, commonly used commands, such as listing all files in a directory, changing directories, creating a new directory, creating files, locating files, moving files, displaying user information, getting a current path, or clearing a shell screen are expected to be used regularly and would have a much higher threshold than other commands that are used for specialized purposes. In some situations, if the code branch is even used once, it may be important to maintain. Accordingly, in such scenarios, the threshold may be set to 0, requiring the count to never be above 0 to be indicated as unused.

If the branch of code is below (or, in some cases, equal to) the threshold, the process 300 includes providing an indication (block 308) that the branch is not used often. The indication may include a pop-up or other alert that is displayed on a graphical user interface (GUI), as explained further below. The indication that the code is not in use may be used to flag the code for removal or other suitable action.

If the branch of code is determined to be in use above (or in some cases, equal to) the threshold, the process 300 includes providing an indication (block 310) that the code is in use, which in some cases may simply be not providing the notification discussed in block 308. Branches of code that are determined to be in use above the particular threshold may be then tagged or identified as sections of code that should not be removed from the code and/or designated as regularly-called code.

In some embodiments, the process 300 may determine how many times a particular code was called in a first time period and compare the number of times the particular block of code was called in a second time period to determine if the use of the particular block of code increased or decreased over time. By determining an increase or decrease in use, the process 300 may be able to provide further analysis to indicate that the code is frequently called, called under certain conditions only, whether the code uses more resources than is desirable, and so forth. By determining an increase or decrease in use, the process 300 may also be able to generate an indication to alert an organization of particular activity (e.g., an increase in certain files being accessed, copied, or moved).

FIG. 4 is a flow chart, illustrating a process 400 for identifying unused code based upon when a particular line or block of code was switched. The process 400 includes identifying (block 402) a switch statement. As may be appreciated, the switch statement may allow for a switch over from old code to new code using a conditional statement with a hardcoded variable or value that is used to determine whether the conditional statement is matched. Accordingly, the variable or value may switch 'on' a particular new code, while switching of a particular old code. To identify the feature switch, the code corpus may be analyzed to identify these conditional statement with a corresponding hardcoded variable or value that is used to determine whether the conditional statement is matched. Once found, the analysis may determine whether the conditional statement, being evaluated with respect to the hardcoded variable or value, results in refrained execution of certain code (e.g., which may be classified as "old" code). If so, the conditional statement may be identified as feature switch.

The process 400 includes determining (block 404) when the last switch of the feature switch statement occurred. To do this, the process 400 may include identifying when the last edit to the hardcoded variable or value occurred. In the case that the hardcoded variable or value is provided in a code corpus, a revision history of the code corpus may be accessed to identify when the variable or value last changed. In the case that the hardcoded variable or value is provided in an external datastore (e.g., a database), a modification history of the datastore field storing the hardcoded variable or value may be used to identify when the variable or value last changed. The hardcoded variable or value change indicates when the switchover to new code occurred, thus indicating how "fresh" the changeover to the new code is.

The process 400 includes determining (block 406) whether the last switch time (e.g., the last time when the hardcoded value or variable was changes, as identified in block 404) breaches a particular threshold. That is, the process 400 includes determining whether the last switch to the new code occurred within a threshold period of time, which may indicate that there may still be a desire to retain the old code in case there is a need to roll back the changes instituted via the new code. If the last switch statement is determined to breach the particular threshold, the process 400 includes providing an indication (block 408) that the branch of code is not being used. As discussed above, the indication that the code is not in use may be used to identify the code for removal or other suitable action. The indication may include a pop-up or other alert that is displayed on a graphical user interface (GUI). The indication that the code is not in use may be used to flag the code for removal or other suitable action.

FIG. 5 is a flow chart illustrating a process 500 for identifying unused code by monitoring performance of code in an application/program, in accordance with embodiments described herein. The process 500 may use a profiler (e.g., AppDynamic profiler) to monitor and analyze code, runtime, and behavior. The process 500 includes identifying (block 502) all available functions, which may be obtained via a function of the profiler that, when called provides a list of all functions in the code being analyzed. As discussed above, certain functions (e.g., listing all files in a directory, changing directories, creating a new directory, creating files, locating files, moving files, displaying user information, getting a current path, or clearing a shell screen) may be expected to be called more frequently than other functions. The entire list of available functions will include many more functions than just those that are frequently called. For example, the entire list of available functions will include functions other than those for accessing files.

The process 500 includes comparing (block 504) the list of all available functions to those that are called. Indeed, the process 500 may use this comparison to determine functions that are not being used, yet are still available (e.g., by subtracting out the used functions from the available functions). As discussed above, the associated unused code may be utilizing resources (e.g., memory) that could be reallocated.

The process 500 may then identify (block 506) the unused code in order to flag this code as unused and potentially warranting deletion. It may be appreciated that the flagged code may be further analyzed before deletion. For example, the code may be analyzed to determine when the code was last used, if the code has a longer run time in order to execute its instructions, if the corresponding output or action is particularly useful to the business, if the code is indeed using a greater amount of system resources compared to another unused block of code, and so forth. In some embodiments, the code may not be deleted right away or at all and instead another suitable action may be taken. For example, the code may disabled, switched off, further monitored, deleted after a certain period, or deleted only after a particular condition is met.

Figure 6:
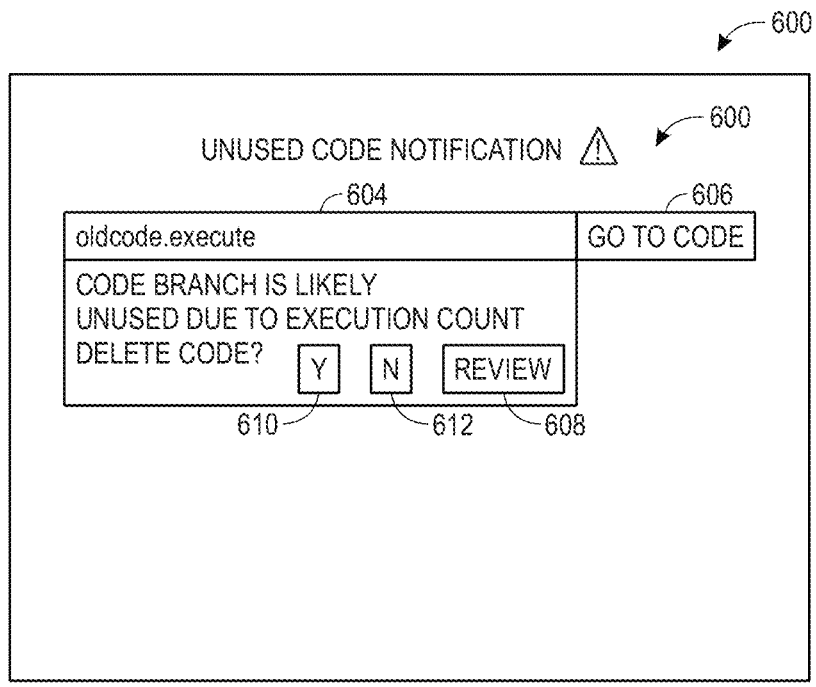
FIG. 6 illustrates a graphical user interface (GUI) that provides an indication of likely un-used code, in accordance with embodiments described herein.

Once the unused code is identified (e.g., via one of the processes described in FIGS. 3-5), it may be useful to provide an indication of unused code and provide options for reviewing and/or removing the unused code. FIG. 6 illustrates a graphical user interface (GUI) 600 for providing an indication of unused code, in accordance with embodiments described herein. The GUI 600 may be used to facilitate actions on code identified as unused. The GUI 600 may include various selectable icons, drop down menus, and the like to implement preferred selections (e.g., to select the desired block of code to be selected for a particular document). In the illustrated embodiment, the GUI 600 may provide a code notification 602. The code notification 602 may be used to alert a user of unused code, underutilized code, or outdated code. For example, as mentioned above, unused code may be identified when a line or block of code has not ever been called or not called for a certain period. Unused code may be a path or variable that is unused or a function or global object that is not accessed.

In one embodiment, the unused code may be identified via use of a code coverage tool. The code coverage tool may be used to run the code with varied inputs in order to test the code. By varying the inputs, the user can identify unreached code (e.g., unused code) by determining which blocks of code were not accessed through the various inputs. In a similar manner, underutilized code may be identified via the code coverage tool. Underutilized code may be identified when a line or block of code has not been called in relation to a particular business function (e.g., a particular objective related to business operations).

As discussed above, certain blocks of code may become obsolete over time as business needs, policies, procedures, and other organizational changes occur. The code viewer 604 may provide a preview of code identified as unused (e.g., "oldcode.execute"). Further, a link (e.g., here in the form of a button 606), may provide access to the code corpus that includes the identified outdated code. Upon selection of the button 606, the code corpus may be opened to the location where the identified unused code is located.

The selectable icons may be used to perform actions on the one or more of the identified blocks of code. For example, a selectable icon may provide an option to review/edit the code (button 608), delete the code (button 610), or ignore the unused identification (block 612). In some embodiments, the code may be deleted permanently. In other embodiments, one or more blocks of code may be recoverable and/or deleted only when a particular condition was met (e.g., code block not called for over the next 26,000 hours).

Indeed, the selected block of code may be flagged for deletion after a certain time period or after the particular block of code has not been called for a period of time. In other embodiments, the selected blocks of code that may be associated with a particular project, outcome, business objective, or so forth may be identified and deleted based upon a particular project objective (e.g., a phase of project being completed). Once the identified block of code has been identified, the button 610 may be used to delete the code. It may be appreciated that the selectable icons may be used in order to execute any other suitable action for the identified code, such as flagging or disabling the selected code and/or enabling an option to show revisions to the code.

Figure 7:
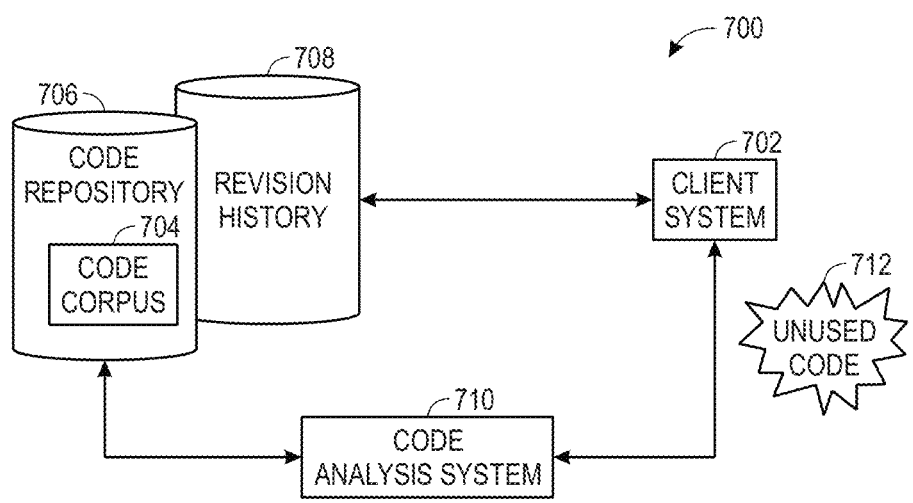
FIG. 7 is a block diagram of system for identifying unused code, in accordance with embodiments described herein.

FIG. 7 is a block diagram of system 700 for identifying unused code, in accordance with embodiments described herein. The system 700 includes a client system 702 that may be used by a user to generate a code corpus 704 in a code repository 706. As modifications occur, a revision history 708 may be generated, indicating what changes occur and when they occurred.

A code analysis engine 710 may analyze the code corpus 704 and/or the revision history 708 to identify unused code, as discussed herein. Upon identifying unused code, the code analysis engine 710 may provide a notification 712 to the client system 702 (or another computer system), providing an indication of the unused code. This may enable users/computers to quickly identify and remediate unused code in their code corpus 704.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A tangible, non-transitory, computer-readable medium, comprising computer-readable instructions that, when executed by one or more computer processors, cause the one or more computer processors to:
   track code execution of computer code currently executing;
   based upon the tracking, identify one or more portions of the computer code as unused code portions, wherein the one or more computer processors identify a switch statement in the one or more portions of the computer code by identifying a conditional statement in the one or more portions of the computer code that is conditioned upon a hardcoded value, wherein the conditional statement is causing a code branch of the one or more portions of the computer code not to execute;
   identify the code branch that does not execute as at least one of the unused code portions; and
   provide a graphical user interface (GUI) comprising an indication of the unused code portions.

2. The tangible, non-transitory, computer-readable medium of claim 1, comprising computer-readable instructions that, when executed by the one or more computer processors, cause the one or more computer processors to:
   identify a last time the hardcoded value was changed; and
   identify the code branch of the one or more portions of the computer code as the at least one of the unused code portions only when the last time the hardcoded value was changed breaches a threshold time period.

3. The tangible, non-transitory, computer-readable medium of claim 2, comprising computer-readable instructions that, when executed by the one or more computer processors, cause the one or more computer processors to:
   identify the last time the hardcoded value was changed by analyzing a revision history of a code corpus, data store, or both for a change in the hardcoded value.

4. The tangible, non-transitory, computer-readable medium of claim 1, comprising computer-readable instructions that, when executed by the one or more computer processors, cause the one or more computer processors to:
   track the code execution using a code profiler that provides a count of executions of code branches within the computer code; and
   identify a subset of the code branches that breach an execution count threshold as the one or more portions of the computer code identified as the unused code portions.

5. The tangible, non-transitory, computer-readable medium of claim 1, comprising computer-readable instructions that, when executed by the one or more computer processors, cause the one or more computer processors to:
   identify, using a code profiler, a set of all available functions within the computer code;
   identify, using the code profiler, a set of functions executed during the execution of the computer code;
   identify a set of unused functions based upon a comparison of the set of all available functions to the set of functions executed during the execution of the computer code; and
   identify the unused functions as the one or more portions of the computer code identified as the unused code portions.

6. The tangible, non-transitory, computer-readable medium of claim 1, wherein the GUI comprises a preview of the one or more portions of the computer code, a link to the one or more portions of the computer code, or both.

7. The tangible, non-transitory, computer-readable medium of claim 1, wherein the GUI comprises an affordance to delete, review, or both the one or more portions of the computer code.

8. A system, comprising:
   a client computer;
   a computer code repository storing a computer code;
   a code analysis engine, configured to:
     track code execution of the computer code currently executing;
     based upon the tracking, identify one or more portions of the computer code as unused code portions, wherein the code analysis engine is configured to identify a switch statement in the one or more portions of the computer code by identifying a conditional statement in the one or more portions of the computer code that is conditioned upon a hardcoded value, wherein the conditional statement is causing a code branch of the one or more portions of the computer code not to execute;
     identify the code branch that does not execute as at least one of the unused code portions; and
     provide a graphical user interface (GUI) comprising an indication of the unused code portions.

9. The system of claim 8, wherein the code analysis engine is configured to:
   identify a last time the hardcoded value was changed; and identify the code branch of the code as the at least one of the unused code portions only when the last time the hardcoded value was changed breaches a threshold time period.

10. The system of claim 9, comprising:
a revision history of the computer code; and
wherein the code analysis engine is configured to:
identify the last time the hardcoded value was changed by analyzing the revision history of the computer code for a change in the hardcoded value.

11. The system of claim 8 wherein the code analysis engine is configured to:
track the code execution using a code profiler that provides a count of executions of code branches within the computer code; and
identify a subset of the code branches that breach a execution count threshold as the one or more portions of the computer code identified as the unused code portions.

12. The system of claim 8, wherein the code analysis engine is configured to:
identify, using a code profiler, a set of all available functions within the computer code;
identify, using the code profiler, a set of functions executed during the execution of the computer code;
identify a set of unused functions based upon a comparison of the set of all available functions to the set of functions executed during the execution of the computer code; and
identify the unused functions as the one or more portions of the computer code identified as the unused code portions.

13. The system of claim 8, wherein the GUI comprises a preview of the one or more portions of the computer code, a link to the one or more portions of the computer code, or both.

14. The system of claim 8, wherein the GUI comprises an affordance to delete, review, or both the one or more portions of the computer code.

15. A computer-implemented method, comprising:
tracking code execution of computer code currently executing;
based upon the tracking, identifying one or more portions of the computer code as unused code portions, wherein identifying the one or more portions of the computer code as unused code portions comprises identifying a switch statement in the one or more portions of the computer code by identifying a conditional statement in the one or more portions of the computer code that is conditioned upon a hardcoded value, wherein the conditional statement is causing a code branch of the one or more portions of the computer code not to execute;
identifying the code branch that does not execute as at least one of the unused code portions; and
providing a graphical user interface (GUI) comprising an indication of the unused code portions.

16. The computer-implemented method of claim 15, comprising:
identifying a last time the hardcoded value was changed by analyzing a revision history of a code corpus, data store, or both for a change in the hardcoded value; and
identifying the code branch of the code as at least one of the unused code portions when the last time the hardcoded value was changed breaches a threshold time period.

17. The computer-implemented method of claim 15, comprising:
tracking the code execution using a code profiler that provides a count of executions of code branches within the computer code; and
identifying a subset of the code branches that breach a execution count threshold as the one or more portions of the computer code identified as the unused code portions.

18. The computer-implemented method of claim 15, comprising:
identifying, using a code profiler, a set of all available functions within the computer code;
identifying, using the code profiler, a set of functions executed during the execution of the computer code;
identifying a set of unused functions based upon a comparison of the set of all available functions to the set of functions executed during the execution of the computer code; and
identifying the unused functions as the one or more portions of the computer code identified as the unused code portions.

19. The computer-implemented method of claim 15, wherein the GUI comprises a preview of the one or more portions of the computer code, a link to the one or more portions of the computer code, or both.

20. The computer-implemented method of claim 15, wherein the GUI comprises an affordance to delete, review, or both the one or more portions of the computer code.

* * * * *